US012122291B1

(12) United States Patent
Haran

(10) Patent No.: US 12,122,291 B1
(45) Date of Patent: Oct. 22, 2024

(54) METHOD AND SYSTEM FOR WARNING NEARBY ROAD-USERS AT RISK USING EXTERIOR VEHICLE LIGHTS

(71) Applicant: AUTOTALKS LTD., Kfar Netter (IL)

(72) Inventor: Onn Haran, Kfar Netter (IL)

(73) Assignee: Autotalks Ltd., Tel Aviv (IL)

( * ) Notice: Subject to any disclaimer, the term of this patent is extended or adjusted under 35 U.S.C. 154(b) by 43 days.

(21) Appl. No.: 18/325,151

(22) Filed: May 30, 2023

(51) Int. Cl.
*B60Q 1/50* (2006.01)
*G06V 20/56* (2022.01)
*H04W 4/40* (2018.01)

(52) U.S. Cl.
CPC ............... *B60Q 1/50* (2013.01); *G06V 20/56* (2022.01); *H04W 4/40* (2018.02)

(58) Field of Classification Search
CPC ............ B60Q 1/50; H04W 4/40; G06V 20/56
See application file for complete search history.

(56) References Cited

U.S. PATENT DOCUMENTS

| | | | | |
|---|---|---|---|---|
| 10,373,259 | B1* | 8/2019 | Konrardy | G06Q 40/08 |
| 10,909,866 | B2* | 2/2021 | Jacobus | G08G 1/163 |
| 11,312,386 | B2* | 4/2022 | Haran | G08G 1/096791 |
| 11,432,118 | B2* | 8/2022 | Haran | H04L 1/1896 |
| 11,490,234 | B2* | 11/2022 | Haran | G08G 1/162 |
| 11,763,410 | B1* | 9/2023 | Roy | G06Q 20/407 |
| | | | | 701/117 |
| 12,020,342 | B2* | 6/2024 | Roy | H04L 9/3213 |
| 12,046,145 | B2* | 7/2024 | Jacobus | B60W 10/20 |
| 2013/0218415 | A1* | 8/2013 | Stahlin | B60W 50/06 |
| | | | | 701/41 |
| 2018/0208195 | A1* | 7/2018 | Hutcheson | B60W 50/14 |
| 2019/0088148 | A1* | 3/2019 | Jacobus | G05D 1/81 |
| 2020/0193829 | A1* | 6/2020 | Cheng | G08G 1/168 |
| 2020/0342760 | A1* | 10/2020 | Vassilovski | G08G 1/161 |
| 2021/0082296 | A1* | 3/2021 | Jacobus | G05D 1/0246 |
| 2021/0082297 | A1* | 3/2021 | Jacobus | G08G 1/096725 |
| 2021/0104165 | A1* | 4/2021 | Jacobus | G08G 1/005 |

(Continued)

OTHER PUBLICATIONS

Muhammad Hashir Rehan "Analysis of BMW and Audi Headlights' Technology: International Standards and Road-Safety in Pakistan" Ghulam Ishaq Khan Institute of Engineering Sciences and Technology (GIKI). (2020).

(Continued)

*Primary Examiner* — Hoi C Lau
(74) *Attorney, Agent, or Firm* — Nathan & Associates; Menachem Nathan

(57) ABSTRACT

In a self-vehicle with V2X communication capability and with an enhanced ADAS, a method for warning nearby road-users at risk using exterior vehicle lights, the method comprising by the enhanced ADAS, analyzing the behavior of a non-V2X connected road-user ahead and/or a non-V2X connected road-user behind the self-vehicle using inputs from at least one sensor of the self-vehicle and from V2X communications received in the self-vehicle, determining from the analysis that the non-V2X connected road-user ahead and/or the non-V2X connected road-user behind poses a risk to another road-user, and warning the non-V2X connected road-user ahead and/or the non-V2X connected road-user behind that it poses the risk using a special lighting pattern displayed on an exterior part of the self-vehicle.

20 Claims, 9 Drawing Sheets

(56) References Cited

U.S. PATENT DOCUMENTS

| | | | |
|---|---|---|---|
| 2021/0110726 A1* | 4/2021 | Jacobus | G05D 1/81 |
| 2021/0120384 A1* | 4/2021 | Haran | H04L 1/1812 |
| 2021/0248915 A1* | 8/2021 | Jacobus | G05D 1/249 |
| 2021/0253113 A1* | 8/2021 | Haran | G08G 1/096775 |
| 2022/0201442 A1* | 6/2022 | Haran | H04W 4/40 |
| 2022/0264268 A1* | 8/2022 | Haran | H04W 4/40 |
| 2022/0301435 A1* | 9/2022 | Fefer | H04W 4/40 |
| 2023/0410242 A1* | 12/2023 | Roy | G06Q 30/06 |
| 2024/0067087 A1* | 2/2024 | Tucker | B60Q 11/00 |
| 2024/0067224 A1* | 2/2024 | Oh | B60W 60/0025 |

OTHER PUBLICATIONS

Tamburo et al; "Programmable Automotive Headlights" Computer Vision—ECCV 2014 pp. 750-765. (2014).

\* cited by examiner

METHOD AND SYSTEM FOR WARNING NEARBY ROAD-USERS AT RISK USING EXTERIOR VEHICLE LIGHTS

FIELD

Embodiments disclosed herein relate generally to methods and systems (or apparatii) for warning road-users near to an put at risk by a self-vehicle using exterior vehicle lights, and in particular, methods and systems for analyzing risks of nearby road-users, vehicles, two-wheelers, or pedestrians without vehicle-to-everything (V2X) connectivity, using data available from all sensors, including V2X, and warning them using special lighting patterns.

BACKGROUND

V2X communication can mitigate most accidents between all road-users, but only if those road-users are "connected", i.e. if they have V2X communication devices (also referred to as "V2X devices" or simply "V2X") or "V2X connectivity". Even with massive V2X penetration, some road-users will remain not V2X-connected (also referred to as "non-connected"), and will not benefit from enhanced road safety.

Currently, an Advanced Driver Assistance System (ADAS) only protects the vehicle it is installed in. Assume that each self-vehicle mentioned below includes an ADAS. Nearby road-users who are put at risk ("endangered road-users") by road-users other than the self-vehicle (e.g. by "endangering vehicles" having "endangering drivers") are not warned.

Note that an endangered road-user does not need to be connected. It may have V2X to directly transmit its location, but, if non-connected, it may be detected by a nearby vehicle with V2X that will share (report) its location using sensor sharing.

Several examples of dangerous situations relevant to road-users are illustrated in FIGS. 1-4.

FIG. 1 illustrates a dangerous overtake example. Four vehicles 102, 104, 106 and 108 are driving on a road 110. Vehicle 102 drives in one direction, while vehicles 104, 106 and 108 drive in the opposite direction. Vehicle 106 (which is an endangering vehicle) is shown attempting a dangerous overtake. In known art, if vehicle 106 is not V2X connected it will not be warned and it will probably crash into vehicle 102. If one of the other vehicles is a connected vehicle that is aware of the crash risk, it would be advantageous and desirable that it warn endangering vehicle 106 from attempting the overtake.

FIG. 2 illustrates an example of a dangerous turn at an intersection 202 between two roads 204 and 206. An endangering non-connected vehicle 208 fails to estimate correctly the risk to a fast-approaching two-wheeler 210. It would be advantageous and desirable if a nearby connected vehicle 212 (for which two-wheeler 210 is a "road-user ahead", see also definition below), would alert the driver of vehicle 208 from making that mistake.

FIG. 3 illustrates an example of a dangerous crossing at an intersection 302 between two roads 304 and 306. A non-connected vehicle 308 and a connected two-wheeler 310 cannot detect each other, potentially causing a side collision. While both 308 and 310 can be considered to be endangering vehicles, only one (the vehicle ahead or vehicle behind the self-vehicle) is relevant in a method described herein. If the self-vehicle is 312, then 310 would be the vehicle ahead, will be considered to be the endangering one, and will be warned. If the self-vehicle is 314, then vehicle 308 would be the vehicle ahead, will be considered to be the endangering one, and will be warned. It would be advantageous and desirable that nearby vehicles with V2X connectivity (such as vehicles 312 and/or 314) observe the risk and warn vehicle 308 and two-wheeler 310.

FIG. 4 illustrates an example of a dangerous pedestrian crossing. The figure shows a person (pedestrian) 402 attempting to cross a road in front of vehicles 404 and 406. While vehicle 404 has a clear visibility of pedestrian 402, vehicle 406 (which is an endangering vehicle) can be surprised by pedestrian 402. It would be advantageous and desirable that nearby vehicles (such as 404 and/or 408) with connectivity observe the risk, whether if the pedestrian is connected or detected using sensor sharing, and warn endangering vehicle 406.

SUMMARY

This disclosure provides methods and systems for analyzing, in vehicular driving environments, risks of road-users (e.g. vehicles, two-wheelers, or pedestrians) with or without V2X connectivity that are nearby a self-vehicle with V2X connectivity, using data available from all sensors including V2X, and for warning non-connected endangering road-users using special lighting patterns. The analysis and warning are preformed by an "enhanced" ADAS system in the self-vehicle (defined and described in more detail with reference to FIG. 7 below). As used herein, the term "special lighting pattern" refers to a light pattern that can be displayed on or by any exterior light fixture, structure or part of a vehicle, such as on or by headlights, indicator lights, braking lights, toggle lights, etc. A special lighting pattern disclosed herein may also be formed or projected using projecting lights based on micro-electro-mechanical-systems (MEMS) or using a basic light emitting diode (LED) or a plurality of LEDS, etc. A special lighting pattern disclosed herein may also be formed or projected by switching a high headlight beam at a much higher rate than currently used (for example at 5 times or more per second), i.e. much faster than a human driver can blink.

In exemplary embodiments, there is provided a method comprising: providing a self-vehicle with a V2X communication capability and with an enhanced ADAS; by the enhanced ADAS, analyzing the behavior of a non-V2X connected road-user ahead and/or a non-V2X connected road-user behind the self-vehicle using inputs from at least one sensor of the self-vehicle and from V2X communications received in the self-vehicle; determining from the analysis that the non-V2X connected road-user ahead and/or the non-V2X connected road-user behind poses a risk to other road-users; and warning the non-V2X connected road-user ahead and/or the non-V2X connected road-user behind that it poses the risk using a special lighting pattern displayed on an exterior part of the self-vehicle.

In exemplary embodiments, there is provided a system installed in a self-vehicle, the system comprising: a V2X communication unit; at least one sensor; and an enhanced ADAS configured to analyze the behavior of a non-V2X connected road-user ahead and/or a non-V2X connected road-user behind the self-vehicle using inputs from the at least one sensor and from V2X communications received by the V2X communications unit, to determine from the analysis that the non-V2X connected road-user ahead and/or the non-V2X connected road-user behind poses a risk to other road-users, and to warn the non-V2X connected road-user ahead and/or the non-V2X connected road-user behind that it poses the risk using a special lighting pattern displayed on an exterior part of the self-vehicle.

In some examples, the enhanced ADAS includes a nearby non-connected road-users risk assessment unit configured to analyze the behavior of a non-V2X connected road-user ahead and/or a non-V2X connected road-user behind the self-vehicle using inputs from the at least one sensor and from V2X communications received by the V2X communications unit, to determine from the analysis that the non-V2X connected road-user ahead and/or the non-V2X connected road-user behind poses a risk to other road-users, and to warn the non-V2X connected road-user ahead and/or the non-V2X connected road-user behind that it poses the risk using a special lighting pattern displayed on an exterior part of the self-vehicle.

In some examples, a system includes a front light controller and a rear light controller for activating and controlling the respective special lighting pattern on, respectively, a front exterior section and a back exterior section of the swelf vehicle, using inputs provided by the enhanced ADAS.

In some examples, each of the non-V2X connected road-user ahead and/or road-user behind is a vehicle, and the warning is issued only if the warning does not distract a driver of the respective non-V2X connected vehicle.

In some examples, the special lighting pattern includes a lighting pattern formed using exterior vehicle lights selected from the group consisting of headlights, indicator lights, braking lights and toggle lights.

In some examples, the special lighting pattern includes a lighting pattern formed or projected using projecting lights based on micro-electro-mechanical system elements.

In some examples, the special lighting pattern includes a lighting pattern formed or projected using projecting lights based on one or more light emitting diodes.

In some examples, the non-V2X connected road-user behind is an endangering vehicle, and the risk includes a dangerous overtake by the endangering vehicle.

In some examples, the non-V2X connected road-user ahead is an endangering vehicle, and the risk includes a dangerous turn of the endangering vehicle at an intersection.

In some examples, the another road-user is a V2X connected road-user.

In some examples, the another road-user is a road-user detected and reported by a vehicle other than the self-vehicle using V2X communications.

In some examples, the another road-user is selected from the group consisting of a vehicle, a motorcycle, a bicycle and a pedestrian.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Figure 5:
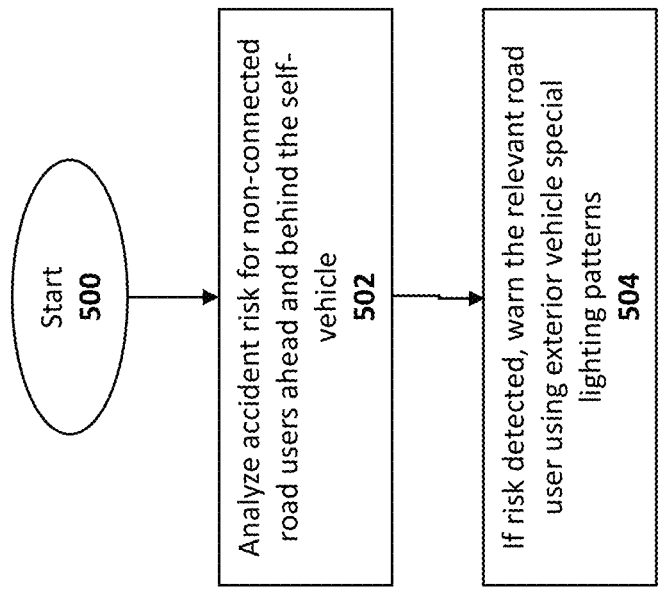
FIG. 5 illustrates a high-level flow chart of warning nearby road-users at risk by using exterior lights.

FIG. 5 illustrates a high-level flow chart of an exemplary method disclosed herein. As mentioned, the operation is performed by an enhanced ADAS in a self-vehicle with V2X connectivity. The operation starts periodically at step 500. The typical period is 100 msec. In step 502, a risk or danger (e.g. for an accident) of nearby (immediately neighboring) road-users, with or without V2X connectivity and whether ahead or behind the self-vehicle is analyzed. The endangered road-user may be a vehicle, a two-wheeler (motorcycle, bicycle, scooter, etc.), or a pedestrian. As used herein, the term "risk" relates to a head-on collision or accident, a rear-end collision or accident, or a side accident with other road-users (i.e. any road-user other the than self-vehicle). As used herein, a "road-user ahead" may be a nearby road-user immediately ahead of the self-vehicle in the same lane, or a nearby road-user ahead of the self-vehicle in an opposite lane. As used herein, a "road-user behind" may be a nearby road-user immediately behind the self-vehicle in the same lane, or a nearby road-user behind the self-vehicle in an opposite or different lane. The future paths of nearby road-users are calculated to assess risk to the self-vehicle. This calculation may be done in a known way. Additional checks are added between the future paths of nearby road-users and other road-users in the vicinity of the self-vehicle to check if the paths cross. The logic of risk assessment is identical for any pair of road-users, whether the self-vehicle or a nearby road-user.

In step 504, based on the analysis results and if not distracting the focus of the driver of the endangering vehicle, a warning or alert is issued by the self-vehicle to the endangering vehicle about the risk. The warning or alert is in the form of a special external vehicle lighting pattern, using either exterior front or rear lights, according to need.

The term "driver focus" above is now clarified. In an example scenario, if the endangering driver looks at the warning or alert (in the form of a special external vehicle lighting pattern) and the endangered road-user is at the edge of the endangering driver's field-of-view, then the endangered road-user will be placed at an even greater risk due to the warning, hence, the warning should not be issued. In another example scenario, if a two-wheeler (bicycle or motorcycle) is approaching an intersection from the right side, then if a vehicle on the left side will warn, the endangering driver will look to the left instead of to the right, and will increase the risk of hitting the rider of the two-wheeler. The attention (focus) of the endangering driver could be shifted (i.e. he/she will be distracted) if for example an angle formed by a line extended from the endangering vehicle to the endangered road-user and a line extended from the endangering vehicle to the self-vehicle is higher than a threshold (e.g. 30 degrees). If the endangering driver and his/her focus are distracted, the likelihood that the driver will hit the endangered road-user may grow.

Figure 6:
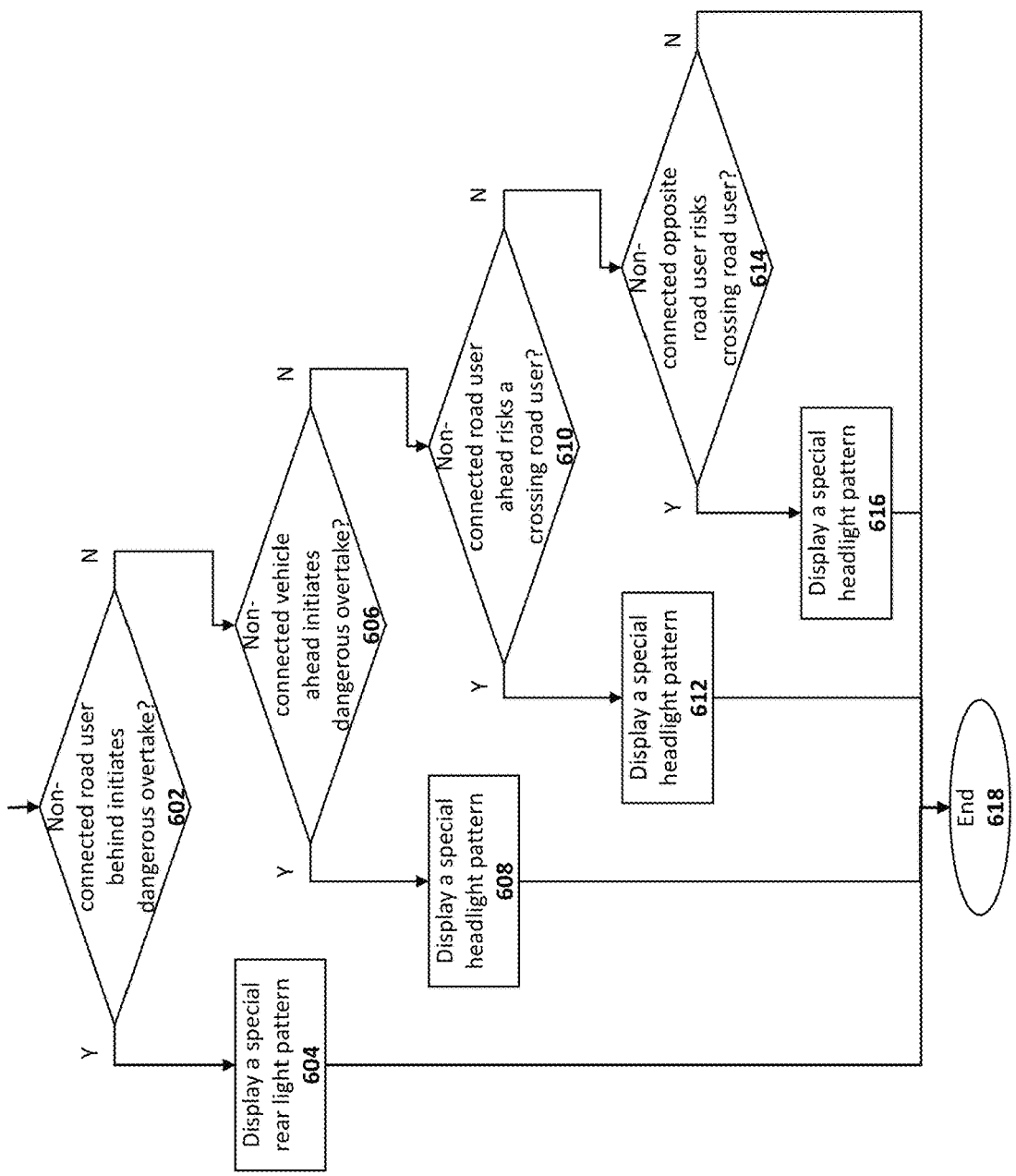
FIG. 6 illustrates a flow chart of warning nearby road-users at risk by using exterior lights.

FIG. 6 illustrates a flow chart of an exemplary method for warning non-connected nearby road-users at risk by using exterior lights, providing more exemplary details of the operations in FIG. 5. The operation starts periodically at step 600 (same as step 500). All actions in FIG. 6 are performed by the self-vehicle, using an enhanced ADAS, which is described below. The enhanced ADAS performs the risk and driver focus distraction analysis and the control and issue of the warnings. In step 602, it is checked if a road-user behind initiates a dangerous overtake that poses a risk to an endangered road-user. As above, the endangered road-user may be a vehicle, a two-wheeler (motorcycle, bicycle, scooter, etc.), or a pedestrian. The initiation of an overtake (i.e. a passing of the self-vehicle) is detected by the self-vehicle when the road-user behind (for example a vehicle) turns on its left turn light and shifts its heading and lateral position to the left (for vehicles driving on the right) or turns on its right turn light and shifts its heading and lateral position to the right (for vehicles driving on the left). The overtake is considered to be "dangerous" if the road-user behind and a vehicle in the opposite lane are expected to collide while both road-users are driving at the current speed. As the road-user behind is non-connected, it has to be detected by a camera or by other vehicle sensors like Radar or Lidar. At present, only highly automated vehicles include a long-distance rear camera, but a "reverse" camera available on practically all current vehicles can be effective for short-distance detection, which is the relevant case since the road-user behind is nearby to the self-vehicle. If true, the operation continues from step 604, where a special lighting pattern is displayed using rear lights of the self-vehicle or other lighting pattern as mentioned above or below. Note that in this case, the special lighting pattern is different from a typical braking light pattern. In an example, the special lighting pattern may include toggling left and right braking lights. In other examples, the special lighting pattern may also be formed or projected using projecting lights based on MEMS, or using a basic LED or a plurality of LEDS. Next, the operation ends at step 618.

If step 602 indicated that the road-user behind does not initiate a dangerous overtake, the operation continues from step 606. Step 606 checks a similar dangerous overtake scenario, applying the same conditions, but for a road-user ahead of the self-vehicle. The front camera of the self-vehicle is used to identify the road-user ahead. If the road-user ahead is found to attempt a dangerous overtake, the operation continues from step 608, where a special lighting pattern is displayed using headlights of the self-vehicle or other lighting as mentioned above or below. Note that in this case, the special lighting pattern is different from a typical high-beam light pattern. In an example, the special lighting pattern may include toggling left and right high-beam lights. In other examples, the special lighting pattern may also be formed or projected using projecting lights based on MEMS, using a basic LED or a plurality of LEDS, or by switching a high headlight beam at a much higher rate than currently used (for example at 5 times or more per second). Next, the operation ends at step 618.

If step 606 indicated that the road-user ahead does not initiate a dangerous overtake, the operation continues from step 610, in which it is checked if the road-user ahead represents a risk to a crossing road-user. The road-user ahead may be a vehicle or a two-wheeler (e.g. motorcycle, bicycle, moped, etc.) while the crossing road-user can also be a pedestrian. The check validates if the two road-users are about to cross each others paths during the next N seconds, where N is typically (but not limited to) 4 sec. The crossing of their paths may be at an intersection, a crossroad, or an arbitrary location in which the pedestrian bursts into the road. The road-user ahead is non-connected, and its properties are detected using the front camera. If true (road-user ahead represents a risk to the crossing road-user), the operation continues from step 612, where a special lighting pattern is displayed in the headlights. As above, the special lighting pattern may include toggling the left and right high-beam lights or may be formed or projected using projecting lights based on MEMS, using a basic LED or a plurality of LEDS, or switching a high headlight beam at a much higher rate than currently used (for example at 5 times or more per second). Next, the operation ends at step 618. If false in step 610 (no risk), then operation continues from step 614, in which it is checked if the road-user in the opposite direction risks a crossing road-user. The conditions are similar to step 610. If true, the operation continues from step 616, where a special lighting pattern is displayed in the headlights through multiple patterns that capture attention by a front LED light bar or an array of LED lights, if existing. Next, the operation ends at step 618. If false in step 614, the operation ends at step 618.

Figure 1:
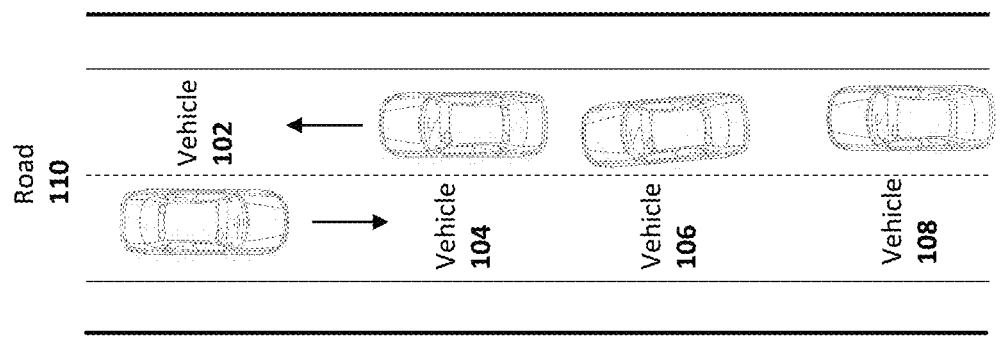
FIG. 1 illustrates a dangerous overtake example.

The method of FIG. 6 can be demonstrated with more details using the examples and road-users in FIGS. 1-4. In FIG. 1, vehicle 108 is a self-vehicle. Non-connected vehicle 106 is attempting an overtake of vehicle 104. All other vehicles are connected. According to steps 602 and 604, vehicle 104 uses its rear lights and/or LED lighting as above, and vehicle 108 uses its headlights and/or LED or MEMS based lighting as above to warn vehicle 106.

Figure 2:
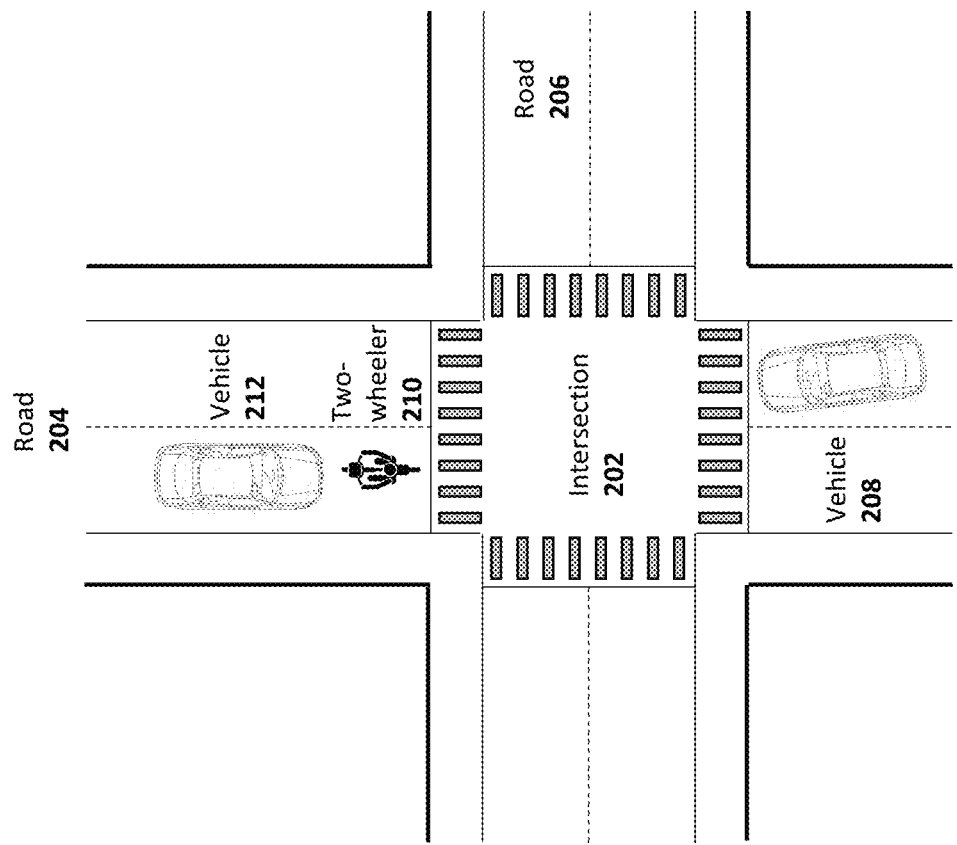
FIG. 2 illustrates a dangerous turn example.

In FIG. 2, vehicle 212 is a self-vehicle. Non-connected vehicle 208 is initiating a left turn, risking two-wheeler 210. Vehicle 212 warns both two-wheeler 210 (according to steps 610 and 612) and vehicle 208.

Figure 3:
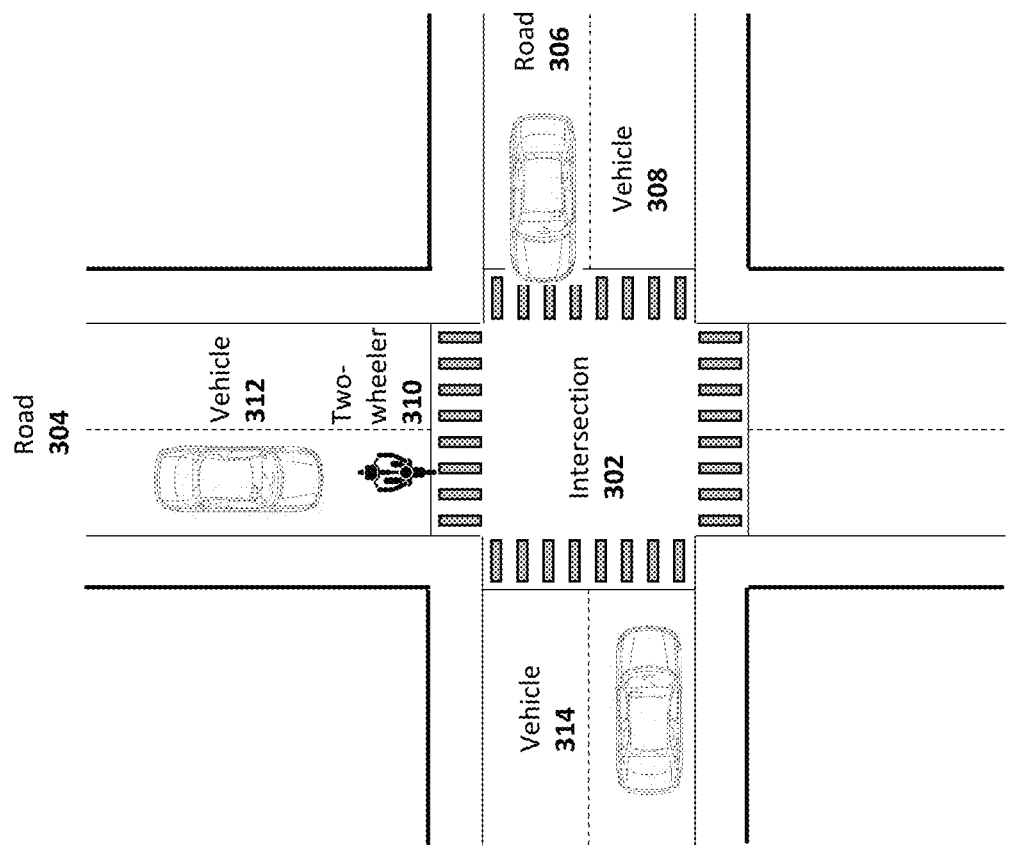
FIG. 3 illustrates a dangerous crossing example.

In FIG. 3, vehicle 314 is a self-vehicle. Non-connected vehicle 308 and connected two-wheeler (with e.g. a motorcyclist) 310 are about to hit each other when entering intersection 302. Connected vehicle 314 detects the risk and warns using a special lighting pattern (e.g. with headlights or with LED lighting), according to steps 614 and 616. Vehicle 312 may also be able to observe the risk if its sensors are more alert than motorcyclist 310. In that case, it will vehicle 312 may also warn using e.g. as above its headlights and/or LED lighting as above.

Figure 4:
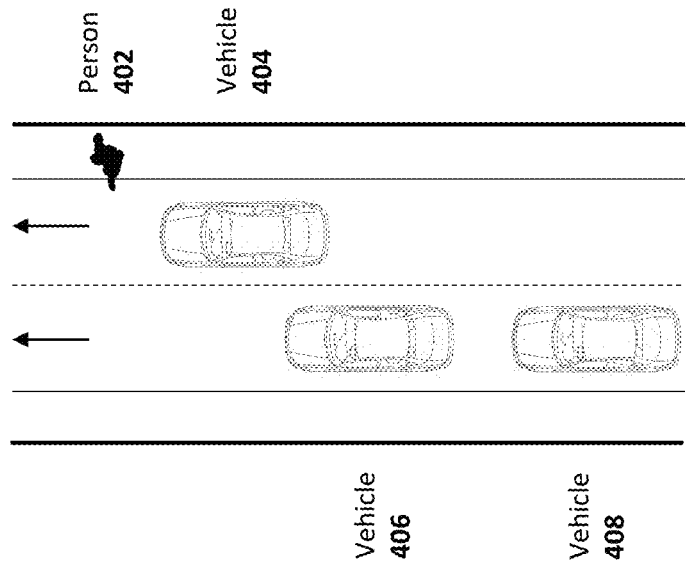
FIG. 4 illustrates a dangerous pedestrian crossing example.

In FIG. 4, vehicle 408 is a self-vehicle. Person 402 can be hit by vehicle 408. The person may have V2X (in which case it can be warned through V2X), or connected vehicle 404 may apply sensor sharing to detect the pedestrian and send his/her location. Connected vehicle 408 then becomes aware of the person and warns vehicle 406 by using its headlights and/or LED lighting as above.

Figure 7:
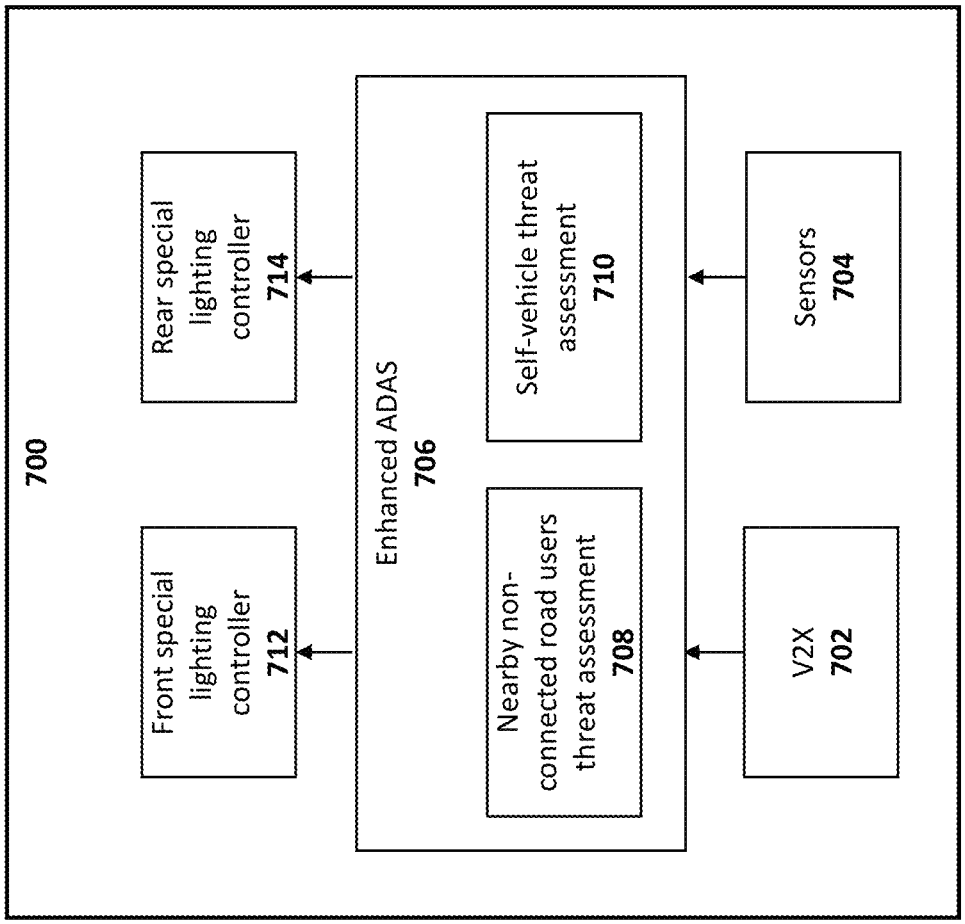
FIG. 7 illustrates a block diagram of a system warning nearby road-users at risk by using exterior lights.

FIG. 7 illustrates in a block diagram an embodiment of a system for warning nearby road-users at risk by using exterior lights and controlled by ADAS, the system numbered 700. System 700 includes a V2X communication unit (or simply V2X unit) 702 configured to detect hidden road-users for indicating their locations, and at least one sensor 704 for detecting nearby road-users (for example a front camera, a "reverse" camera, radars, and/or Lidars). V2X unit 702 and sensor(s) 704 feed respective data to an enhanced ADAS 706. In contrast with known ADAS, ADAS 706 is "enhanced" by including a nearby non-connected road-users risk assessment unit 708 and a legacy, self-vehicle risk assessment unit 710. Unit 708 is configured to implement methods or algorithms expressed by the flowcharts of FIG. 5 and FIG. 6, i.e. to analyze the behavior of a non-V2X connected road-user ahead and/or a non-V2X connected road-user behind the self-vehicle using inputs from the at least one sensor and from V2X communications received by the V2X communications unit, to determine from the analysis that the non-V2X connected road-user ahead and/or the non-V2X connected road-user behind poses a risk to other road-users, and to warn the non-V2X connected road-user ahead and/or the non-V2X connected road-user behind that it poses the risk using a special lighting pattern displayed on an exterior part of the self-vehicle. Unit 710 is a legacy unit that identifies all the potential risks to the self-vehicle imposed by nearby road-users, as detected by self-vehicle unit 702 and/or at least one sensor 704. The analysis covers head-on, rear-end, and side accidents (for which the same logic is applied, i.e. crossing of future paths) with road-users other than the self-vehicle. ADAS 706 controls a front special lighting pattern controller 712 and a rear special lighting pattern controller 714 for activating and controlling a special lighting pattern as above or below.

Figure 8A:
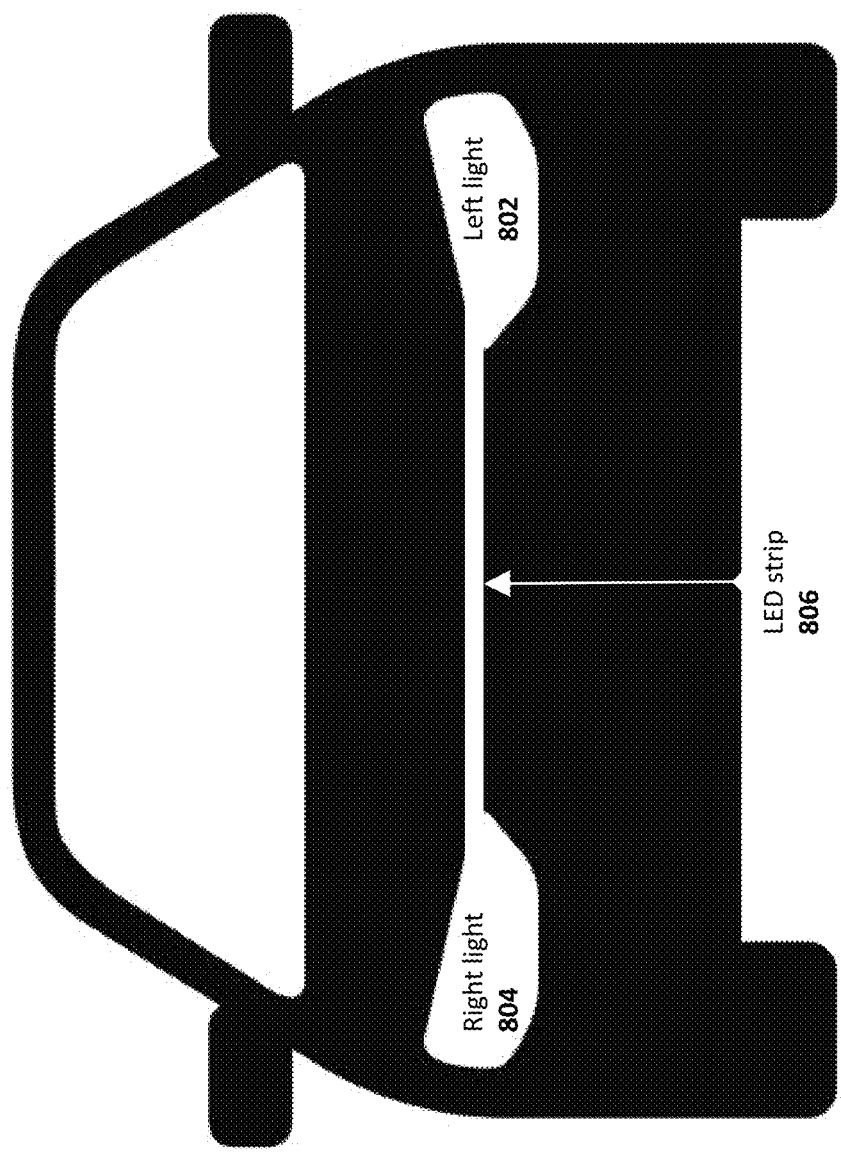
FIG. 8A illustrates a vehicle and its headlights.

FIG. 8A illustrates a vehicle's headlights which include a left light 802 and a right light 804. In an example, a toggling pattern may switch on a high beam of left light 802, then switch on a high beam on right light, 804, and then repeat. Also shown is an optional LED strip 806 that can display a moving pattern in addition to or instead of the high beam toggling.

Figure 8B:
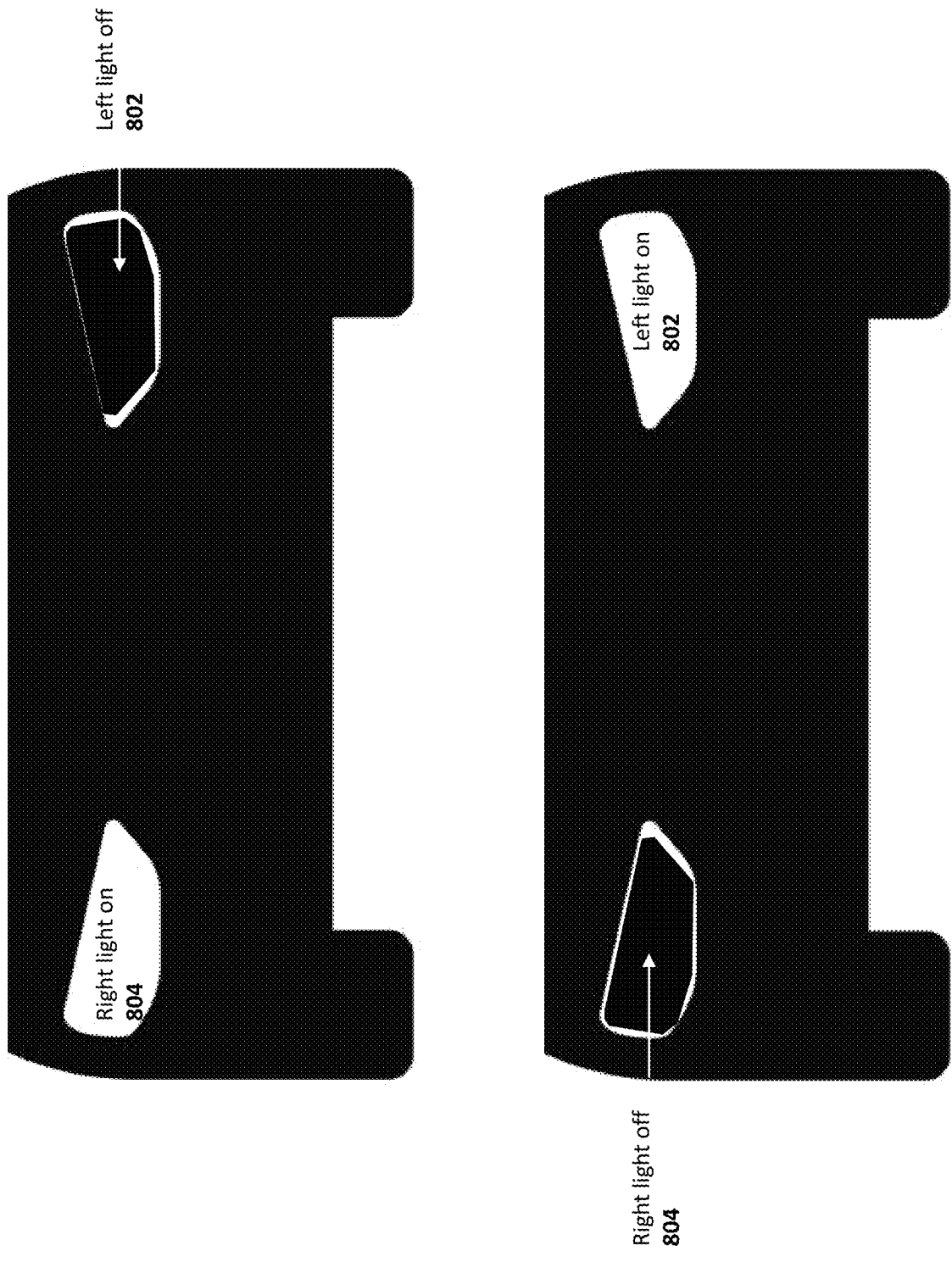
FIG. 8B illustrates an example of a special lighting pattern implemented with headlights.

FIG. 8B illustrates an example of a special lighting pattern implemented with headlights. In the first sequence, right headlight 804 is on while left headlight 802 is off. Next, upon toggling, right headlight 804 is off while left light 802 is on. That toggling may be performed N (for example 10) times per second, until the risk is no longer present.

Unless otherwise defined, all technical and scientific terms used herein have the same meaning as commonly understood by one of ordinary skill in the art. The materials, methods, and examples provided herein are illustrative only and not intended to be limiting.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment or implementation are necessary in every embodiment or implementation of the disclosure. Further combinations of the above features and implementations are also considered to be within the scope of some embodiments or implementations of the disclosure.

While certain features of the described implementations have been illustrated as described herein, many modifications, substitutions, changes, and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations and embodiments described.

What is claimed is:

1. In an vehicular driving environment, a method comprising:
    providing a self-vehicle with a vehicle-to-everything (V2X) communication capability and with an enhanced Advanced Driver Assistance System (ADAS);
    by the enhanced ADAS, analyzing the behavior of a non-V2X connected road-user ahead and/or a non-V2X connected road-user behind the self-vehicle using inputs from at least one sensor of the self-vehicle and from V2X communications received in the self-vehicle;
    determining from the analysis that the non-V2X connected road-user ahead and/or the non-V2X connected road-user behind poses a risk to another road-user; and
    warning the non-V2X connected road-user ahead and/or the non-V2X connected road-user behind that it poses the risk using a special lighting pattern displayed on an exterior part of the self-vehicle.

2. The method of claim 1, wherein each of the non-V2X connected road-user ahead and/or road-user behind is a vehicle, and wherein the warning is issued only if the warning does not distract a driver of the respective non-V2X connected vehicle.

3. The method of claim 1, wherein the special lighting pattern includes a lighting pattern formed using exterior vehicle lights selected from the group consisting of headlights, indicator lights, braking lights and toggle lights.

4. The method of claim 1, wherein the special lighting pattern includes a lighting pattern formed or projected using projecting lights based on micro-electro-mechanical system elements.

5. The method of claim 1, wherein the special lighting pattern includes a lighting pattern formed or projected using projecting lights based on one or more light emitting diodes.

6. The method of claim 1, wherein the non-V2X connected road-user behind is an endangering vehicle, and wherein the risk includes a dangerous overtake by the endangering vehicle.

7. The method of claim 1, wherein the non-V2X connected road-user ahead is an endangering vehicle, and wherein the risk includes a dangerous turn of the endangering vehicle at an intersection.

8. The method of claim 1, wherein the another road-user is a V2X connected road-user.

9. The method of claim 1, wherein the another road-user is a road-user detected and reported by a vehicle other than the self-vehicle using V2X communications.

10. The method of claim 1, wherein the another road-user is selected from the group consisting of a vehicle, a motorcycle, a bicycle and a pedestrian.

11. A system installed in a self-vehicle, the system comprising:
    a vehicle-to-everything (V2X) communication unit;
    at least one sensor; and
    an enhanced Advanced Driver Assistance System (ADAS) configured to analyze the behavior of a non-V2X connected road-user ahead and/or a non-V2X connected road-user behind the self-vehicle using inputs from the at least one sensor and from V2X communications received by the V2X communications unit, to determine from the analysis that the non-V2X connected road-user ahead and/or the non-V2X connected road-user behind poses a risk to other road-users, and to warn the non-V2X connected road-user ahead and/or the non-V2X connected road-user behind that it poses the risk using a special lighting pattern displayed on an exterior part of the self-vehicle.

12. The system of claim 11, wherein the enhanced ADAS includes a nearby non-connected road-users risk assessment unit configured to analyze the behavior of a non-V2X connected road-user ahead and/or a non-V2X connected road-user behind the self-vehicle using inputs from the at least one sensor and from V2X communications received by the V2X communications unit, to determine from the analysis that the non-V2X connected road-user ahead and/or the non-V2X connected road-user behind poses a risk to other road-users, and to warn the non-V2X connected road-user ahead and/or the non-V2X connected road-user behind that it poses the risk using a special lighting pattern displayed on an exterior part of the self-vehicle.

13. The system of claim 11, further comprising a front light controller and a rear light controller for activating and controlling the respective special lighting pattern on, respectively, a front exterior section and a back exterior section of the swelf vehicle, using inputs provided by the enhanced ADAS.

14. The system of claim 11, wherein each of the non-V2X connected road-user ahead and/or road-user behind is a vehicle, and wherein the warning is issued only if the warning does not distract a driver of the respective non-V2X connected vehicle.

15. The system of claim 11, wherein the special lighting pattern includes a lighting pattern formed using exterior vehicle lights selected from the group consisting of headlights, indicator lights, braking lights and toggle lights.

16. The system of claim 11, wherein the special lighting pattern includes a lighting pattern formed or projected using projecting lights based on one or more light emitting diodes.

17. The system of claim 11, wherein the non-V2X connected road-user behind is an endangering vehicle, and wherein the risk includes a dangerous overtake by the endangering vehicle.

18. The system of claim 11, wherein the non-V2X connected road-user ahead is an endangering vehicle, and wherein the risk includes a dangerous turn of the endangering vehicle at an intersection.

19. The system of claim 11, wherein the another road-user is a V2X connected road-user.

20. The system of claim 11, wherein the another road-user is a road-user detected and reported by a vehicle other than the self-vehicle using V2X communications.

\* \* \* \* \*